United States Patent
Sekaran et al.

(10) Patent No.: US 7,937,442 B2
(45) Date of Patent: May 3, 2011

(54) MULTIPOINT CONTROL UNIT (MCU) FAILURE DETECTION AND ROLLOVER

(75) Inventors: Dhigha Sekaran, Redmond, WA (US); Sankaran Narayanan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 514 days.

(21) Appl. No.: 11/552,905

(22) Filed: Oct. 25, 2006

(65) Prior Publication Data

US 2008/0077666 A1 Mar. 27, 2008

Related U.S. Application Data

(63) Continuation-in-part of application No. 11/534,411, filed on Sep. 22, 2006.

(51) Int. Cl.
*G06F 15/16* (2006.01)
*H04N 7/15* (2006.01)

(52) U.S. Cl. ........ 709/204; 709/221; 709/223; 709/224; 709/226; 370/260; 715/753; 348/14.09

(58) Field of Classification Search .................. 709/204, 709/221, 224, 226
See application file for complete search history.

(56) References Cited

U.S. PATENT DOCUMENTS

| | | | |
|---|---|---|---|
| 5,710,591 A | 1/1998 | Bruno et al. | |
| 5,838,664 A | 11/1998 | Polomski | |
| 5,841,763 A | 11/1998 | Leondires et al. | |
| 6,020,915 A | 2/2000 | Bruno et al. | |
| 6,081,513 A | 6/2000 | Roy | |
| 6,404,745 B1 | 6/2002 | O'Neil et al. | |
| 6,584,077 B1 | 6/2003 | Polomski | |
| 6,606,306 B1 | 8/2003 | Lin et al. | |
| 6,879,565 B2 | 4/2005 | Baxley et al. | |
| 7,054,933 B2 | 5/2006 | Baxley et al. | |
| 2001/0019354 A1 * | 9/2001 | Einarsson et al. | |
| 2001/0054070 A1 * | 12/2001 | Savage et al. | 709/204 |
| 2002/0066109 A1 | 5/2002 | Tam et al. | |
| 2003/0021400 A1 * | 1/2003 | Grandgent et al. | 379/202.01 |

(Continued)

FOREIGN PATENT DOCUMENTS

EP 0889629 1/1999

OTHER PUBLICATIONS

Ahuja, S.R., J. Robert Ensor and David N. Horn, "The Rapport Multimedia Conferencing System," © 1988 ACM, pp. 1-8.

(Continued)

*Primary Examiner* — Ashok B Patel
*Assistant Examiner* — Linglan Edwards
(74) *Attorney, Agent, or Firm* — Perkins Coie LLP

(57) ABSTRACT

A method, system, and architecture for detecting MCU failures is provided. The conference system detects the failure of MCUs that have been allocated to provide shared conference resources to conferences that are being hosted by the conference system. The conference system utilizes the sending and receiving of "heartbeat" messages between the MCUs and the conference server pool to detect failed MCUs. Upon detecting the failure of an MCU, the conference system performs a "rollover" of the conferences which were being serviced by the failed MCU to another available MCU. The conference system may then identify the clients which were connected to the failed MCU and notifies the clients that an MCU rollover has occurred and a new (replacement) MCU is available in order that these clients can reconnect and reestablish their media sessions.

18 Claims, 15 Drawing Sheets

U.S. PATENT DOCUMENTS

| | | | |
|---|---|---|---|
| 2003/0108000 A1* | 6/2003 | Chaney et al. | 370/260 |
| 2003/0147357 A1 | 8/2003 | Zhang et al. | |
| 2003/0153340 A1 | 8/2003 | Crockett et al. | |
| 2003/0167303 A1* | 9/2003 | Zhu et al. | 709/204 |
| 2004/0246332 A1* | 12/2004 | Crouch | 348/14.08 |
| 2005/0007446 A1 | 1/2005 | Schrader et al. | |
| 2005/0012812 A1 | 1/2005 | Seo | |
| 2005/0198209 A1* | 9/2005 | Barrett | 709/219 |
| 2005/0213739 A1 | 9/2005 | Rodman et al. | |
| 2006/0031290 A1* | 2/2006 | Mannaru et al. | 709/204 |
| 2006/0132301 A1* | 6/2006 | Stilp | 340/539.22 |
| 2006/0233120 A1* | 10/2006 | Eshel et al. | 370/260 |
| 2007/0217589 A1 | 9/2007 | Martin et al. | |
| 2008/0077665 A1 | 3/2008 | Sekaran et al. | |

OTHER PUBLICATIONS

Boyer, David G. and Michael E. Lukacs, "The Personal Presence System—A Wide Area Network Resource for the Real Time Composition of Multipoint Multimedia Communications," Multimedia'94, San Francisco, California, © 1994 ACM, pp. 453-460.

U.S. Appl. No. 11/534,411, Sekaran et al.

Cho, Yeong-Hun et al., "Distributed Management Architecture for Multimedia Conferencing Using SIP," Proceedings of the First International Conference on Distributed Frameworks for Multimedia Applications, 2005, IEEE, pp. 1-8.

Lago, Patricia and Gianni CANAL, "A Video-conferencing Distributed Service Tailored for Education," 1999 IEEE International Conference on Multimedia Computing and Systems (ICMS'99), vol. 2, p. 1038.

Sun, Ming-Ting, Tzong-Der Wu and Jenq-Neng Hwang, "Dynamic Bit Allocation in Video Combining for Multipoint Conferencing," IEEE Transactions on Circuits and Systems II, Analog and Digital Signal Processing, vol. 45, No. 5, May 1998, © 1998 IEEE, pp. 644-648.

* cited by examiner

| Get Conference Request Message Identifier | Conference Identifier | Conference Identifier | ... | Conference Identifier |
|---|---|---|---|---|

Get Conference Request Message

FIG. 13

| Get Conference Response Message Identifier | Known Conference Identifier | Known Conference Identifier | ... | Known Conference Identifier |
|---|---|---|---|---|

Get Conference Response Message

FIG. 14

MULTIPOINT CONTROL UNIT (MCU) FAILURE DETECTION AND ROLLOVER

CROSS-REFERENCE TO RELATED APPLICATIONS

This application is a Continuation-In-Part (CIP) of U.S. patent application Ser. No. 11/534,411, entitled "High Availability Conferencing," which was filed on Sep. 22, 2006, the disclosure of which is incorporated by reference herein in its entirety.

BACKGROUND

With the proliferation of computers and the advent of the Internet, and in particular, the maturing of the World Wide Web ("web"), real-time conversations between conversation participants via their computer systems are becoming increasingly common. These conversations, which take place virtually over computer networks, are ever replacing the traditional face-to-face meetings.

Collaboration systems are increasingly being used to conduct these virtual meetings between potentially geographically distributed people. These collaboration systems typically employ multiple servers to provide users the collaboration services. In a typical scenario, a meeting organizer schedules a virtual meeting (a collaboration session) with a collaboration server, and provides a list of people who are expected to participate in the scheduled virtual meeting. The meeting organizer then sends each of the expected participants an invitation inviting the participant to attend the virtual meeting at the scheduled time. At or just prior to the scheduled time, an invited participant can use his or her client computing device, such as laptop computer or handheld device, to establish a network connection to one of the collaboration servers in order to participate in the scheduled virtual meeting.

When a meeting participant at a client device connects to a collaboration server, the collaboration server maintains all of the information regarding the meeting participant and the requested virtual meeting, including information regarding the client device and the collaboration session that is established between the client device and the collaboration server. In current collaboration systems, the collaboration server maintains all of this conferencing information locally, for example, on its local storage device. One problem occurs when the collaboration server to which the client device is connected to becomes unavailable. For example, the collaboration server may become unavailable due to a failure in the connection between the client device and the collaboration server, due to the collaboration server "crashing," due to the collaboration server being taken "offline," and the like. When the meeting participant subsequently tires to reconnect to the virtual meeting, the participant's client device will likely connect to a different collaboration server (i.e., a collaboration server other than the collaboration server to which the client device was previously connected). Since the previously connected collaboration server locally maintained all of the information regarding the meeting participant and the requested virtual meeting, this information is no longer available to the newly connected collaboration server. Thus, the meeting participant will again have to provide his or her authentication information along with the necessary information pertaining to the virtual meeting to the newly connected collaboration server. This results in an unnecessary, additional delay in reconnecting the meeting participant to the virtual meeting. Moreover, the newly connected collaboration server will not be able to recreate the exact virtual meeting environment or state (i.e., the state of the virtual meeting the meeting participant was in just prior to the previously connected collaboration server becoming unavailable) for the meeting participant. This results in an additional drop-off in the level of end user experience with current collaboration systems.

One common solution for maintaining the level of end user experience is to maintain redundant servers. For example, each collaboration server will locally maintain the conference information as well as maintain a "hard replica" of the conference information on a redundant collaboration server. This way, if the collaboration server becomes unavailable for whatever reason, its redundant server can continue processing the collaboration session previously provided by the no longer available collaboration server. One major problem with this solution is the increased costs associated with providing the redundant servers.

SUMMARY

A method, system, and architecture for detecting MCU failures is provided. The conference system detects the failure of MCUs that have been allocated to provide shared conference resources to conferences that are being hosted by the conference system. The conference system utilizes the sending and receiving of "heartbeat" messages between the MCUs and the conference server pool to detect failed MCUs. For example, an MCU failure may occur as a result of a process, machine, and/or service crash. Upon detecting the failure of an MCU, the conference system performs a "rollover" of the conferences which were being serviced by the failed MCU to another available MCU. The conference system may then identify the clients which were connected to the failed MCU and notifies the clients that an MCU rollover has occurred and a new (replacement) MCU is available in order that these clients can reconnect and reestablish their media sessions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 13 is a diagram that illustrates an example get conference request message, according to some embodiments.

FIG. 14 is a diagram that illustrates an example get conference response message, according to some embodiments.

DETAILED DESCRIPTION

Figure 1:
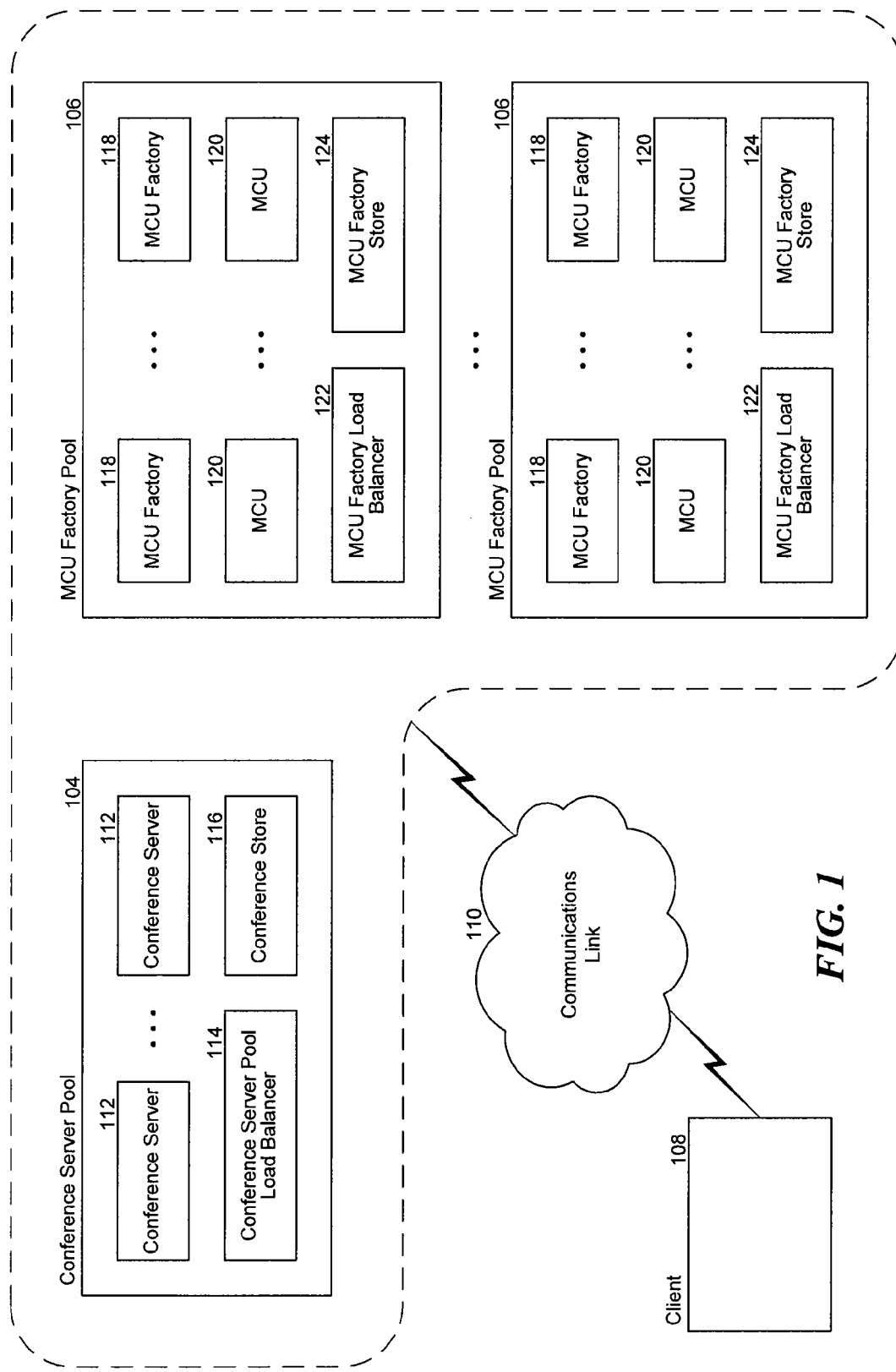
FIG. 1 is a block diagram that illustrates the architecture of a conference system, according to some embodiments.

A method, system, and architecture for providing a conference system that effectively achieves high availability conferencing is provided. In some embodiments, the conference system architecture provides a conference system that comprises a set of stateless conference servers and a shared conference store to provide highly available conferencing to its users. The conference servers serve (host) conferences (meetings) that allow users to conduct distributed conferences that may include text, audio, and video content. Each conference server generally performs conference provisioning operations and conference control operations. The shared conference store provides for the storage of conference state information, thus allowing the conference servers in the conference server pool to be stateless. The set of stateless conference servers and the shared conference store may be provided in a conference server pool, and the conference server pool may provide an interface through which users can access and interact with the conference servers to utilize the provided conferencing services. For example, when the conference server pool receives a request from a user to create (schedule) a conference, the conference server pool allocates a conference server to service the user and directs the user's computer (e.g., a client process (interchangeably referred to herein as a client) executing on the user's computer) to connect to and communicate with the allocated conference server to create a conference. In serving the request to create the conference, the allocated conference server maintains the static conference state information, such as, by way of example, the scheduled time of the conference, the list of participants in the conference, the requested media resources, etc., on the shared conference store. When the conference server pool receives a request from a user to join a conference, the conference server pool allocates a conference server to service the user and directs the client to connect to and communicate with the allocated conference server to join and participate in the conference. Any of the conference servers in the conference server pool may be allocated to service the user's request to join and participate in the conference because the conference state information is maintained (stored) on the shared conference store. While serving the conference, the allocated conference server maintains the dynamic conference state information, such as, by way of example, the clients that have joined the conference, the participant that is currently presenting, etc., on the shared conference store. Subsequently, if the conference server pool receives a request from the same user to reconnect to (rejoin) the same conference, the conference server pool can allocate the same or different conference server to service the user and can direct the client to connect to and communicate with the allocated conference server to reconnect to and participate in the conference. For example, the client may need to rejoin the conference because the connection between the client and the preciously allocated conference server may have been lost. Although the newly allocated conference server may be different from the conference server that previously serviced the client, the newly allocated conference server is able to rejoin the user to the conference with minimal impact because the conference state information is maintained on the shared conference store. As such, each conference server in the conference server pool is identical in that a client can send a conference operation to any conference server serving the conference. In this manner, the conference system, by providing stateless conference servers that maintain conference state information on the shared conference store, can provide users highly available conferencing services.

In some embodiments, a conference server that is serving a conference may also maintain some of the conference state information that is maintained on the shared conference store locally on the conference server, for example, in cache memory. The conference server may then periodically synchronize the locally maintained conference state information with the conference state information maintained on the shared conference store. By locally maintaining the conference state information, the conference server is able to reduce the number of it needs to access the shared conference store, for example, to retrieve the conference state information. In some embodiments, the shared conference store may provide additional redundancy. For example, the shared conference store may copy the conference state information onto a redundant shared conference store, and periodically synchronize the copy of the conference state information on the shared conference store and the redundant shared conference store. In this manner, if the shared conference store happens to become inaccessible for some reason, the conference servers can still access the conference state information maintained on the redundant shared conference store.

In some embodiments, the conference system provides a conference server pool load balancer that assigns work loads to the conference servers in the conference server pool to increase the capacity of the conference server pool. When the conference server pool receives a request, the conference server pool load balancer can allocate a conference server to service the received request based on the current workload of each of the conference servers. For example, the request may be a request from a user to join a conference, and the conference server pool load balancer can allocate the conference server having the lightest workload to service the request. By allocating the conference servers based on the corresponding workloads of the conference servers, the conference server pool load balancer is able to increase the capacity of the conference server pool.

In some embodiments, the conference system uses multipoint control units (MCUs) to provide the conferencing modalities (shared conference resource) such as audio, video, chat, text messaging, application sharing, etc. For example, an audio MCU may provide the audio functionality in a conference. Similarly, a video MCU may provide the video functionality in a conference, an application sharing MCU may provide the application sharing functionality in a conference, a text messaging MCU may provide the text messaging functionality in a conference, and so on. Depending on the functionality provided by an MCU, the MCU may be considered a process that is executing on a computer system. The set of MCUs may be provided in an MCU factory pool, which also comprises one or more MCU factories and an MCU factory store. An MCU factory manages (e.g., monitors, allocates to conference servers, etc.) one or more MCUs that are assigned to the particular MCU factory. The MCU factories maintain the state information regarding their assigned (managed) MCUs, such as the health status of the MCU, the current load placed on the MCU, etc., in the MCU factory store. The MCU factory pool provides an interface through which an MCU can request assignment to an MCU factory in the MCU factory pool in order to make available the conferencing modality provided by the MCU to the conference servers. For example, when the MCU factory pool receives a request from an MCU to be assigned to an MCU factory, the conference server pool assigns the MCU to one of the MCU factories in the MCU factory pool. Alternatively, an MCU factory may have prior knowledge of the MCUs that are assigned to the MCU factory. The MCU factory to which the MCU is assigned can then monitor the status of the assigned MCU and allocate the conferencing modality provided by the assigned MCU to the conference servers. Subsequently, when the MCU factory pool receives a request from a conference server for an MCU factory to support a conference hosted on the conference server, the MCU factory pool allocates an MCU factory to service the conference server and, in particular, the conference hosted by the conference server, and directs the conference server to connect to and communicate with the allocated MCU factory pool in order to provide the necessary conferencing modalities. When the conference server needs to provide a specific conferencing modality in the conference, the conference server can request that the allocated MCU factory allocate an assigned MCU that is capable of providing the specific conferencing modality to the conference server. The MCU factory can allocate the assigned MCUs based on the state information of the MCUs maintained on the MCU factory store. For example, the MCU factory can use the state information of the MCUs maintained on the MCU factory store to allocate its assigned MCUs in a manner as to distribute the work load assigned to the MCUs. The conference server can then direct the clients (users) participating in the conference to connect to and communicate with the allocated MCU in order to participate in the conferencing modality provided by the MCU. While serving (hosting) the conference, the allocated MCU sends conference state information, including user state change information (e.g., which client is presenting, which clients are on mute, etc.), to the conference server pool. When the conference server pool receives the conference state information, the conference server pool allocates a conference server to process the received conference state information. For example, the allocated conference server can process the conference state information by storing it in the shared conference store. Any of the conference servers in the conference server pool may be allocated to process the received conference state information because the conference state information is maintained on the shared conference store. Because the MCU sends the conference state information to the conference server pool, and the conference state information is maintained on the shared conference store, the MCU is able to send the conference state information as long as one conference server is available in the conference server pool. If, during the conference, the conference server detects a failure of an allocated MCU, the conference server can request that the allocated MCU factory allocate another MCU to replace the failed MCU, and the MCU factory can quickly allocate a replacement MCU. The conference server can then direct the clients to connect to the replacement MCU. The replacement MCU may need to determine the last conference state that was being provided by the failed MCU. For example, in the case of a slide presentation MCU, the replacement MCU may need to know the last slide that was being presented. The replacement MCU is able to determine the last conference state that was provided by the failed MCU from the shared conference store. In this manner, the conference system, by providing MCUs that facilitate conferencing modalities, is further able to provide users highly available conferencing services because a failure of any one MCU allocated to a conference does not affect the other aspects of the conference. Moreover, the additional layer of indirection provided by the MCU factories allows any failed MCU in a conference to be quickly replaced by another MCU, thus subjecting the users in the conference to minimal impact.

In some embodiments, an MCU factory may manage a single type of MCU. For example, the MCU factory pool may contain multiple MCU factories that manage video MCUs, multiple MCU factories that manage audio MCUs, multiple MCU factories that manage text messaging MCUs, and the like. For example, when the MCU factory pool receives a request from an audio MCU to be assigned to an MCU factory, the conference server pool assigns the audio MCU to one of the MCU factories in the MCU factory pool that manages audio MCUs. Similarly, when the MCU factory pool receives a request from a video MCU to be assigned to an MCU factory, the conference server pool assigns the video MCU to one of the MCU factories in the MCU factory pool that manages video MCUs. In some embodiments, an MCU factory may manage one or more types of MCUs. For example, the MCU factory pool may contain multiple MCU factories, where each MCU factory is capable of managing one or more MCUs irrespective of the type of MCU.

In some embodiments, the MCU factories, the MCUs, and the MCU factory store may be contained in a single MCU factory pool. In some embodiments, the MCU factories and the MCUs may be contained in multiple MCU factories pools. For example, the video MCUs and the MCU factories that manage the video MCUs may be contained in one MCU factory pool, the audio MCUs and the MCU factories that manage the audio MCUs may be contained in another MCU factory pool, the application sharing MCUs and the MCU factories that manage the application sharing MCUs may be contained in still another MCU factory pool. Each of the MCU factory pools may also comprise an MCU factory store.

In some embodiments, the conference system provides an MCU factory load balancer that assigns work loads to the MCU factories in the MCU factory pool to increase the capacity of the MCU factory pool. When the MCU factory pool receives a request from a conference server for an MCU factory to support a conference hosted on the conference server, the MCU factory load balancer can allocate an MCU factory to service the conference server based on the current workload of each MCU factory. For example, the MCU factory load balancer can allocate the MCU factory having the lightest workload to service the conference server. By allocating the MCU factories based on the corresponding workloads of the MCU factories, the MCU factory load balancer is able to increase the capacity of the MCU factory pool.

In some embodiments, the conference system allows for the scale out of the conference servers contained in the conference server pool in order to increase the processing capacity of the conference server pool. For example, an administrator, or other authorized user, of the conference system may determine that the conference system is executing at or near full capacity. The administrator can simply add additional conference servers in the conference server pool to increase the capacity of the conference system. The conference server pool is able to distribute processing load on the newly added conference server because the conference servers are stateless and the conference state information is maintained on the shared conference store. Similarly, the administrator may also add additional MCUs to the MCU factory pool in order to increase the processing capability of the MCU factory pool. In some embodiments, the conference system may monitor the processing load and automatically add conference servers to the conference server pool and/or MCUs to the MCU factory pool to increase the provided capacity. In this way, the conference system is able to easily increase its processing capability to further provide users highly available conferencing services.

MCU Failure Detection and Rollover

In some embodiments, the conference system detects the failure of MCUs that have been allocated to provide shared conference resources to conferences that are being hosted by the conference system. For example, an MCU failure may occur as a result of a process, machine, and/or service crash. Upon detecting the failure of an MCU, the conference system performs a "rollover" of the conferences which were being serviced by the failed MCU to another available MCU. Rollover of a conference involves allocating a replacement MCU (either a new or the same MCU) to replace the failed MCU and recreating the conference state on the replacement MCU. Recreating the conference state may involve configuring the replacement MCU to run (execute) according to the conference state information maintained on the shared conference store for the conference that is being serviced by the replacement MCU. For example, in the case of an application sharing MCU, the conference state information regarding the conference may indicate that a specific document is being shared. In this instance, the replacement MCU may be configured to continue sharing the specific document. The conference system may then identify the clients which were connected to the failed MCU and notifies the clients that an MCU rollover has occurred and a new (replacement) MCU is available in order that these clients can reconnect and reestablish their media sessions.

In some embodiments, the conference system utilizes the sending and receiving of "heartbeat" messages between the MCUs and the conference server pool to detect failed MCUs. For example, each MCU that is servicing a conference hosted by the conference system may periodically send a keep-alive message (at least one keep-alive message every keep-alive interval) to the conference server pool. When the keep-alive message reaches the conference server pool, the conference server pool allocates a conference server and forwards the keep-alive message to the conference server for processing. The allocated conference server processes the keep-alive message by updating the information regarding the keep-alive messages sent by the MCU on the shared conference store.

The conference system periodically checks to determine whether the expected keep-alive messages have been received from the appropriate MCUs (i.e., the MCUs that are servicing conferences that are being hosted by the conference system). For example, a conference server in the conference server pool may periodically check to determine whether the expected keep-alive messages have been received. If an expected keep-alive message has not been received from an MCU for at least a predetermined period of time (for at least the keep-alive interval), the conference server identifies the MCU as suspected of having failed (also referred to interchangeably herein as a suspected MCU). For example, the conference server may include the MCU in a list of suspected MCUs The MCUs that are identified in the list of suspected MCUs are the MCUs that are suspected of having failed. By way of example, the conference system may be configured such that an MCU that is servicing a conference sends a keep-alive message to the conference server pool at least once every two minutes, which is the keep-alive interval in this example. If the conference server pool does not receive a keep-alive message from an MCU for at least a period of two minutes (the keep-alive interval) since receiving an immediately preceding keep-alive message form the MCU, the conference server identifies the MCU as a suspected MCU.

The conference server then periodically identifies the conferences that are associated with the suspected MCUs. The conferences associated with the suspected MCU are the conferences that are identified as being serviced (hosted) by the suspected MCU. For each suspected MCU, the conference server identifies the conferences that are associated with the suspected MCU and marks the identified conferences as being "suspect." The conference server may include these suspect conferences in a list of suspect conferences (also referred to herein as a "suspect list"), and the list of suspect conferences may be associated with the suspected MCU. The conference server then reevaluates each suspect conference in the list by making a get conference request to the suspected MCU. The get conference request asks the suspected MCU whether or not the suspected MCU is servicing the suspect conference. If the get conference request succeeds (i.e., the suspected MCU is servicing the suspect conference), then the conference server marks the suspect conference as being "healthy" (i.e., no longer suspect). If the get conference request succeeds for all of the suspect conferences associated with the suspected MCU, then the conference server no longer identifies (considers) the MCU as a suspected MCU. If the get conference request fails, then the conference server marks the suspect conference as being "unhealthy." The conference server then performs the rollover of the unhealthy conference(s) onto another MCU. For example, the conference server allocates a replacement MCU and uses the newly allocated MCU to service the unhealthy conference(s).

In some embodiments, the conference server may make a get conference request by sending a get conference request message to the suspected MCU. The get conference request message may include an indication of (i.e., identify) a suspect conference that is identified as being serviced by the suspected MCU, and request that the suspected MCU respond by indicating whether the suspected MCU is servicing the suspect conference indicated in the get conference request message. In some embodiments, the get conference request message may include a list of the suspect conferences that are identified as being serviced by the suspected MCU (a list of conferences associated with the suspected MCU), and request that the suspected MCU send a response that indicates which of the suspect conferences in the list are being serviced by the suspected MCU. If the conference server receives a response to the get conference request message that indicates that all of the suspect conferences in the list are being serviced by the suspected MCU, then the conference server marks the suspect conferences in the list as being healthy and no longer suspect. The conference server no longer identifies the MCU as a suspected MCU. If the conference server receives a response to the get conference request message that indicates that only some of the suspect conferences in the list are being serviced, then the conference server marks the suspect conferences that are indicated as being serviced by the suspected MCU as being healthy and no longer suspect. The conference server marks the suspect conferences in the list that are not indicated as being serviced by the suspected MCU as being unhealthy. If the conference server fails to receive a response to the get conference request message, the conference server marks the suspect conferences in the list as being unhealthy. If there is at least one unhealthy conference, the conference server performs a rollover of the unhealthy conferences by, for example, allocating a replacement MCU for the unhealthy conference(s) and using the replacement MCU to service the unhealthy conference(s). Upon performing the rollover of the unhealthy conference(s), the conference server no longer identifies the MCU as a suspected MCU.

In some embodiments, the conference server, for each unhealthy conference, identifies the clients in the unhealthy conference and sends each identified client an indication of the replacement MCU and requests that the client connect to the indicated replacement MCU to reestablish and continue with the media session (e.g., reestablish and continue with the shared conference resource that was previously provided by the failed MCU and which is now being provided by the replacement MCU). The MCUs and the conference server may use any of a variety of well-known communication techniques and protocols to send and receive the heartbeat messages (e.g., the keep-alive messages, the get conference request messages, and the responses to the get conference request messages).

In some embodiments, the conference system detects a fast-restart of an MCU that has been allocated to provide a shared conference resource to a conference that is being hosted by the conference system. In the case of a fast-restart, an MCU (e.g., process/machine/service) goes down and comes back up within the keep-alive interval so that the receiver of the keep-alive message (i.e., the conference server pool) is not aware of the crash and restart by the MCU. By way of example, an MCU may have been servicing conference A, conference B, and conference C, and periodically sending keep-alive messages to the conference server pool, as required. Subsequent to sending keep-alive message X, the MCU may have performed a fast-restart (e.g., the MCU went down and came back up), and on restarting, sent a subsequent keep-alive message X+1 to the conference server pool, all within the predetermined keep-alive interval. In this instance, the conference system will fail to identify the MCU as a suspected MCU that may no longer be servicing conference A, conference B, and conference C. To facilitate the detection of fast-restarts by MCUs, the conference system includes an instance indicator to the heartbeat messages. The instance indicator included in each heartbeat message provides an indication of the version or instance of the MCU that is sending the heartbeat message. The instance indicator may be a startup timestamp (an indication of the time that the instance of the MCU started executing) or other indicator, such as a count, which identifies one instance of the MCU from another instance of the same MCU. For example, the keep-alive message that is periodically sent by an MCU that is servicing a conference hosted by the conference system may include the instance indicator. The instance indicator is set (e.g., initialized) to a value when the MCU is started and remains constant (remains the same) across all keep-alive messages that are sent by that particular instance of the MCU. If the MCU happens to restart, the MCU initializes itself with a different instance indicator (sets the instance indicator to a different value). The receiver of the keep-alive message (e.g., the conference server processing the keep-alive message) maintains the instance indicator on the shared conference store, for example, as part of the information regarding the keep-alive messages. When the conference server receives a keep-alive message from an MCU, the conference server compares the instance indicator included in the just received keep-alive message with the stored instance indicator which was included in the immediately preceding keep-alive message sent by the MCU. If the two instance indicators are different, then the conference server knows that a fast-restart of the MCU has occurred, and the conference server identifies the MCU as a suspected MCU. The conference server then initiates the suspected MCU processing as discussed above. For example, the conference server identifies the conferences associated with the suspected MCU, verifies which if the identified conferences are unhealthy, and rollsover the unhealthy conferences.

In some embodiments, upon detecting a failure or a fast-restart of an MCU, the conference server identifies the clients which were connected to the MCU and sends the identified clients an indication that the MCU has failed and that the clients should cancel their existing media sessions (e.g., the shared conference resource session provided by the failed MCU) if they have not already done so.

FIG. 1 is a block diagram that illustrates the architecture of a conference system, according to some embodiments. A conference system 102 comprises a conference server pool 104 and a plurality of MCU factory pools 106. The conference system users can use a client 108 to access the conference system via a communications link 110. The client may be a conference system client application (or other application suitable for communicating with and accessing the conference system) that executes on the user's computer or any computing device. The conference server pool comprises a plurality of conference servers 112, a conference server pool load balancer 114, and a conference store 116. The conference servers allow connected clients to perform conferencing. The conference servers are stateless in that conference state information is maintained on the shared conference store. The conference server pool load balancer distributes the work load among the conference servers. The conference store is a shared data store that includes the conference state information that is necessary to provide the conferencing services. The conference store allows the conference servers to maintain the conference state information apart from the conference servers, thus enabling the conference servers to be stateless. The conference store may be implemented using a structured query language (SQL) database backend or some form of distributed shared memory which provides high availability to the conference servers. Each MCU factory pool comprises a plurality of MCU factories 118, a plurality of MCUs 120, an MCU factory load balancer 122, and an MCU factory store 124. Each MCU provides a conferencing modality, and is assigned to an MCU factory. Each MCU factory manages its assigned MCUs by monitoring the state of its assigned MCUs and allocating its assigned MCUs to the conferences hosted by the conference system. For example, each MCU may periodically send its state information to the MCU factory to which it is assigned, thus enabling the MCU factory to monitor the health of the MCU. Alternatively, the MCU factory may periodically query the MCUs to determine their availability. The MCU factory store is a shared data store that includes the information regarding the MCU factories and the MCUs. For example, the MCU factory may maintain the state information for its assigned MCUs on the MCU factory store. The MCU factory load balancer distributes the work load among the MCU factories. One skilled in the art will appreciate that an MCU factory pool is a designation for a grouping of one or more MCUs, one or more MCU factories that manage the one or more MCUs, an MCU factory load balancer, and an MCU factory store. As such, the conference system may comprise a different number of MCU factory pools. For example, the conference system may comprise a single MCU factory pool that includes all of the MCUs and MCU factories. As another example, the conference system may comprise separate MCU factory pools for each type conferencing modality. As still another example, the conference system may comprise a plurality of MCU factory pools, where each MCU factory pool includes a combination of MCUs and MCU factories. Moreover, the MCU factory load balancer is optional, and may not be provided in one or more MCU factory pools. Similarly, the conference server pool load balancer is optional and may not be provided in the conference server pool.

In the architecture in FIG. 1, the client may not have the functionality to connect to the conference system and, in particular, the conference server pool to participate in a conference. These clients may participate in the conference by, for example, connecting to another entity that communicates with an MCU that is allocated for the conference. By way of example, a user may be at an airport with access to only a simple phone. To participate in the conference, the user might dial in to a toll-free number and punch in a number that identifies the conference. The phone system can then look-up the phone MCU for that conference by, for example, querying the conference store directly, or by querying one of the conference servers, and patch the user through directly to the particular phone MCU. Subsequently, if the particular phone MCU were to go down for any reason, the application running on the phone system can determine the newly allocated phone MCU and seamlessly bridge the user over to the newly allocated phone MCU, thus allowing the user to remain in the conference. In this manner, the conference system is able to provide high availability conferencing to a client that is participating in a conference through an MCU allocated for that conference and not a conference server.

In general terms, the communications link facilitates the transfer of electronic content between, for example, the attached client and components of the conference system. In some embodiments, the communications link includes the Internet. It will be appreciated that the communications link may be comprised of one or more other types of networks, such as a local area network, a wide area network, a point-to-point dial-up connection, and the like.

Computing devices on which the conference system, including the conference servers, the conference server pool load balancer, the conference store, the MCU factories, the MCUs, the MCU factory load balancers, the MCU factory stores, and the clients may be implemented may include a central processing unit, memory, input devices (e.g., keyboard and pointing devices), output devices (e.g., display devices), and storage devices (e.g., disk drives). The memory and storage devices are computer-readable media that may contain computer executable instructions that implement the conference system or the described techniques. As used herein, "computer-readable media encoded with computer executable instructions" means computer-readable media comprising computer executable instructions. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the conference system architecture, including the described techniques may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The conference system architecture may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
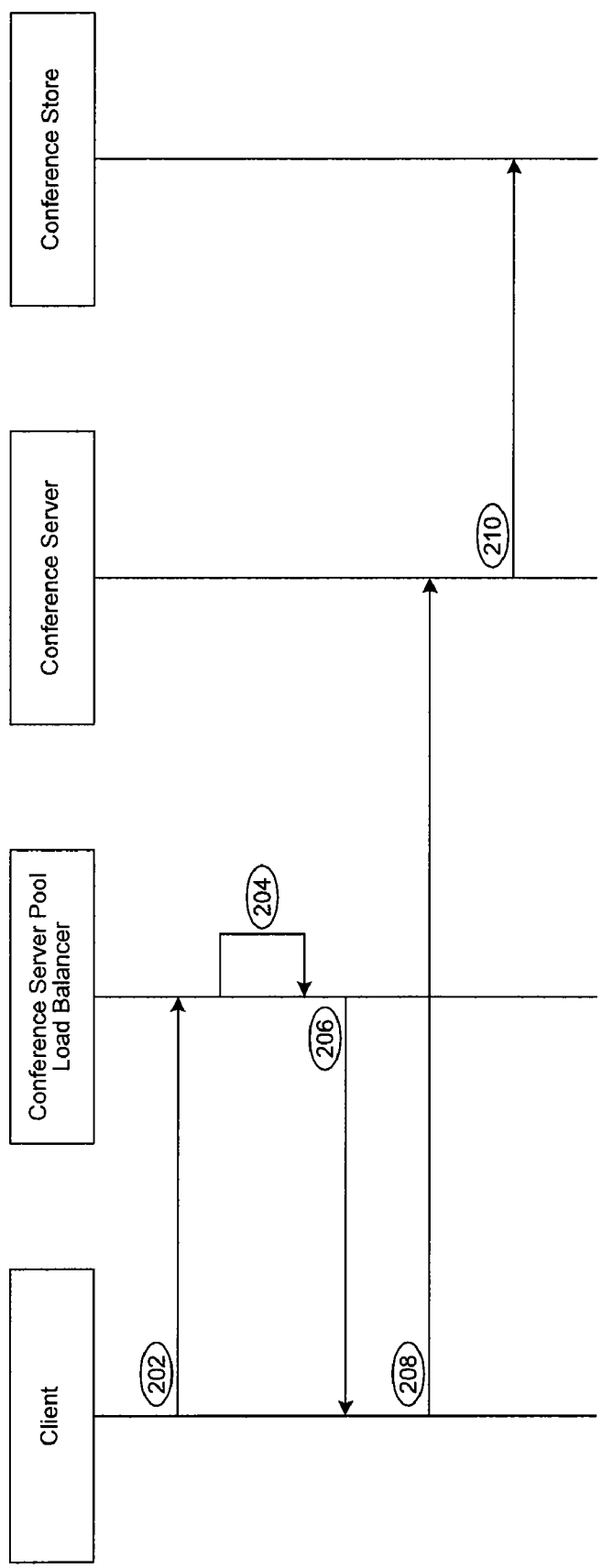
FIG. 2 is a data flow diagram that illustrates the flow of data to join a client to a conference, according to some embodiments.

FIG. 2 is a data flow diagram that illustrates the flow of data to join a client to a conference, according to some embodiments. A user at a client initiates the process of joining a conference hosted by the conference system by sending 202 a request to join the conference to the conference server pool load balancer. Upon receiving the request, the conference server pool load balancer determines 204 which conference server is best suited to process the request and allocates that conference server to process the request. In some embodiments, the conference server pool load balancer allocates the conference server that has the most capacity available. In some embodiments, the conference server pool load balancer allocates the conference server by using a round-robin technique. One skilled in the art will appreciate that many different load balancing techniques may be used to allocate the conference servers in the conference server pool. The conference server pool load balancer then provides 206 an indication of the allocated conference server to the client. The client then sends 208 a request to join the conference to the allocated conference server. Upon receiving the request, the allocated conference server joins the client to the requested conference. In some embodiments, the conference server pool load balancer can route the request to the allocated conference server. The allocated conference server can then process the routed request by, for example, joining the client to the requested conference. In this manner, the conference servers in the conference server pool may be "virtualized" and represented as one entity to the clients. The allocated conference server then updates 210, as necessary, information regarding the conference and the client on the shared conference store. For example, the allocated conference server may update state information regarding the client and the joined conference. The allocated conference server may receive information regarding the client from an MCU that is servicing (hosting) the conference (i.e., from am MCU that is providing a conferencing modality to the conference).

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 3:
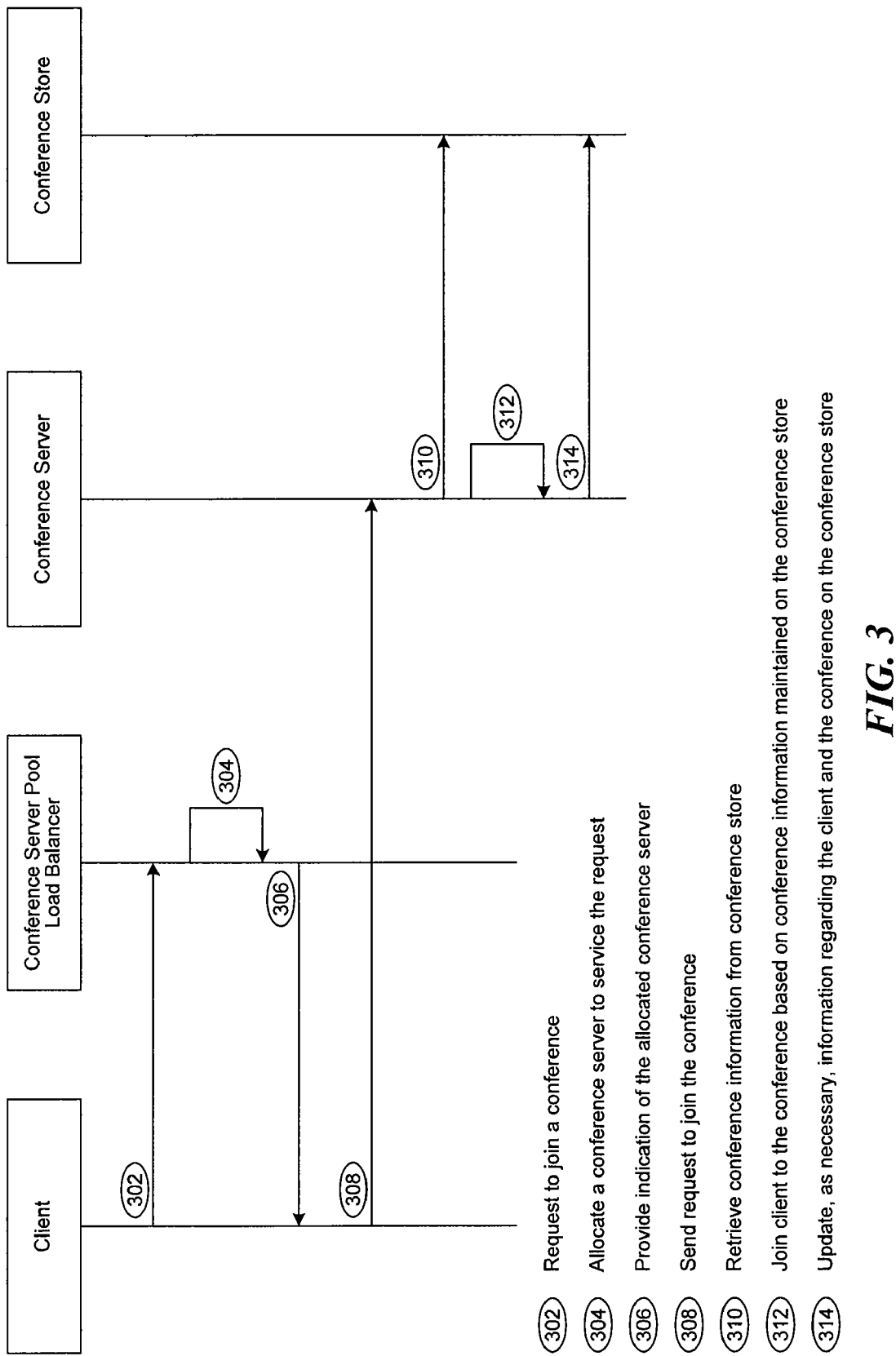
FIG. 3 is a data flow diagram that illustrates the flow of data to join a client to a conference based on existing conference information, according to some embodiments.

FIG. 3 is a data flow diagram that illustrates the flow of data to join a client to a conference based on existing conference information, according to some embodiments. By way of example, a user may have been participating in a conference and the client may have lost its connection to a conference server that was previously allocated to service the client. The user at the client may then initiate a request to join (rejoin) the conference by sending 302 a request to join the conference to the conference server pool load balancer. Upon receiving the request, the conference server pool load balancer determines 304 which conference server is best suited to process the request and allocates that conference server to process the request. The conference server pool load balancer then provides 306 an indication of the allocated conference server to the client. The client then sends 308 a request to join the conference to the newly allocated conference server. Upon receiving the request, the newly allocated conference server retrieves 310 from the shared conference store the conference state information for the requested conference (e.g., the static and dynamic state information for the requested conference). The newly allocated conference server then joins 312 the client to the requested conference based on the conference state information. The newly allocated conference server then updates 314, as necessary, information regarding the conference and the client on the shared conference store.

Figure 4:
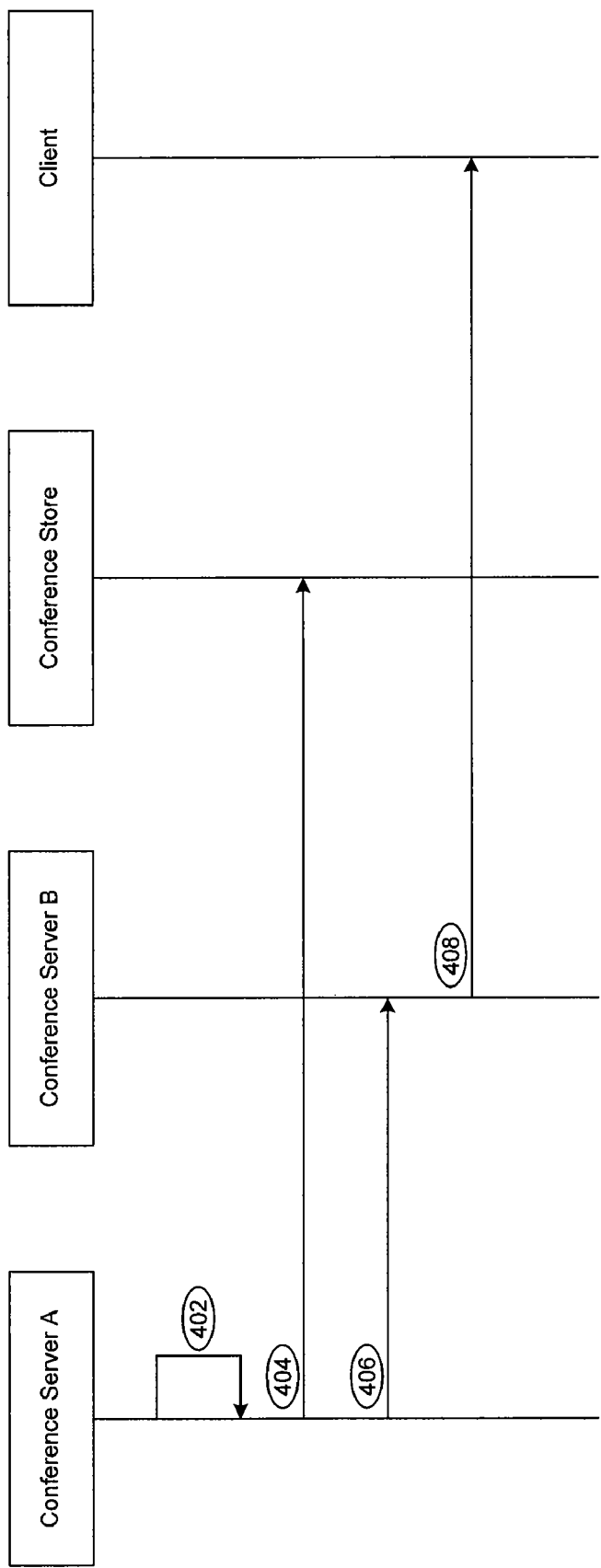
FIG. 4 is a data flow diagram that illustrates the flow of data to send a communication to a client, according to some embodiments.

FIG. 4 is a data flow diagram that illustrates the flow of data to send a communication to a client, according to some embodiments. During a conference, a conference server may determine 402 a need to send a communication (message) to a client that is participating in the conference. The message may include a conference state (e.g., User X has joined the Audio/Video conference resource). Upon determining a need to send a communication to the client, the conference server identifies 404 a conference server to which the client is connected to (i.e., the conference server that the client connected to in order to participate in the conference). The conference server may identity the conference server to which the client is connect to from the conference state information that is maintained on the shared conference store. The conference server then sends 406 to the identified conference server the communication that is to be sent to the client. Upon receiving the communication, the identified conference server sends 408 the communication to the client. In this manner, a client participating in a conference can communicate with any other client participating in the conference via the conference server pool without having to know the conference servers that are servicing the other clients.

Figure 5:
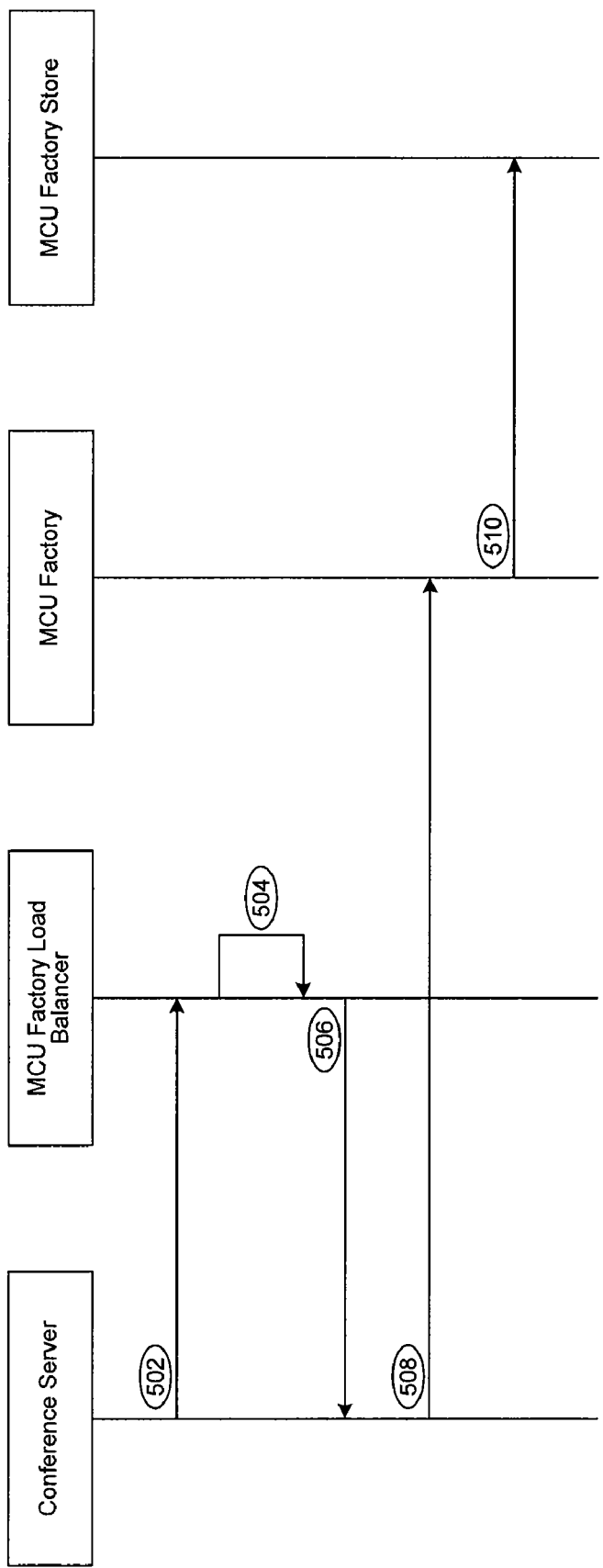
FIG. 5 is a data flow diagram that illustrates the flow of data to obtain an MCU factory for a conference, according to some embodiments.

FIG. 5 is a data flow diagram that illustrates the flow of data to obtain an MCU factory for a conference, according to some embodiments. Upon starting a conference, the conference server may request 502 an MCU factory to support the conference from the MCU factory pool. For example, the conference server may send a request for an MCU factory to the MCU factory load balancer. Upon receiving the request, the MCU factory load balancer determines 504 which MCU factory is best suited to service the conference and allocates that MCU factory to the conference server in order to service the conference. In some embodiments, the MCU factory load balancer allocates the MCU factory that has the most capacity available. One skilled in the art will appreciate that many different load balancing techniques may be used to allocate the MCU factories in the MCU factory pool. The MCU factory load balancer then provides 506 an indication of the allocated MCU factory to the conference server. The conference server then connects 508 to the allocated MCU factory. The conference server may maintain information regarding the allocation of the MCU factory to service the conference on the shared conference store. The allocated MCU factory maintains 510 information regarding the allocated MCU factory on the MCU factory store. For example, the MCU factory maintains information such as the number of conferences that are being serviced (hosted) by the MCU factory, the status of the MCUs assigned to the MCU factory, the availability (load) of the MCUs assigned to the MCU factory, etc. In some embodiments, the conference server may request a specific type of MCU factory from the MCU factory pool. For example, the conference server pool may include MCU factories of various types (e.g., an audio MCU factory that manages audio MCUs, a video MCU factory that manages video MCUs, etc.), and the conference server may request the specific type of MCU factory to service a conference as needed.

Figure 6:
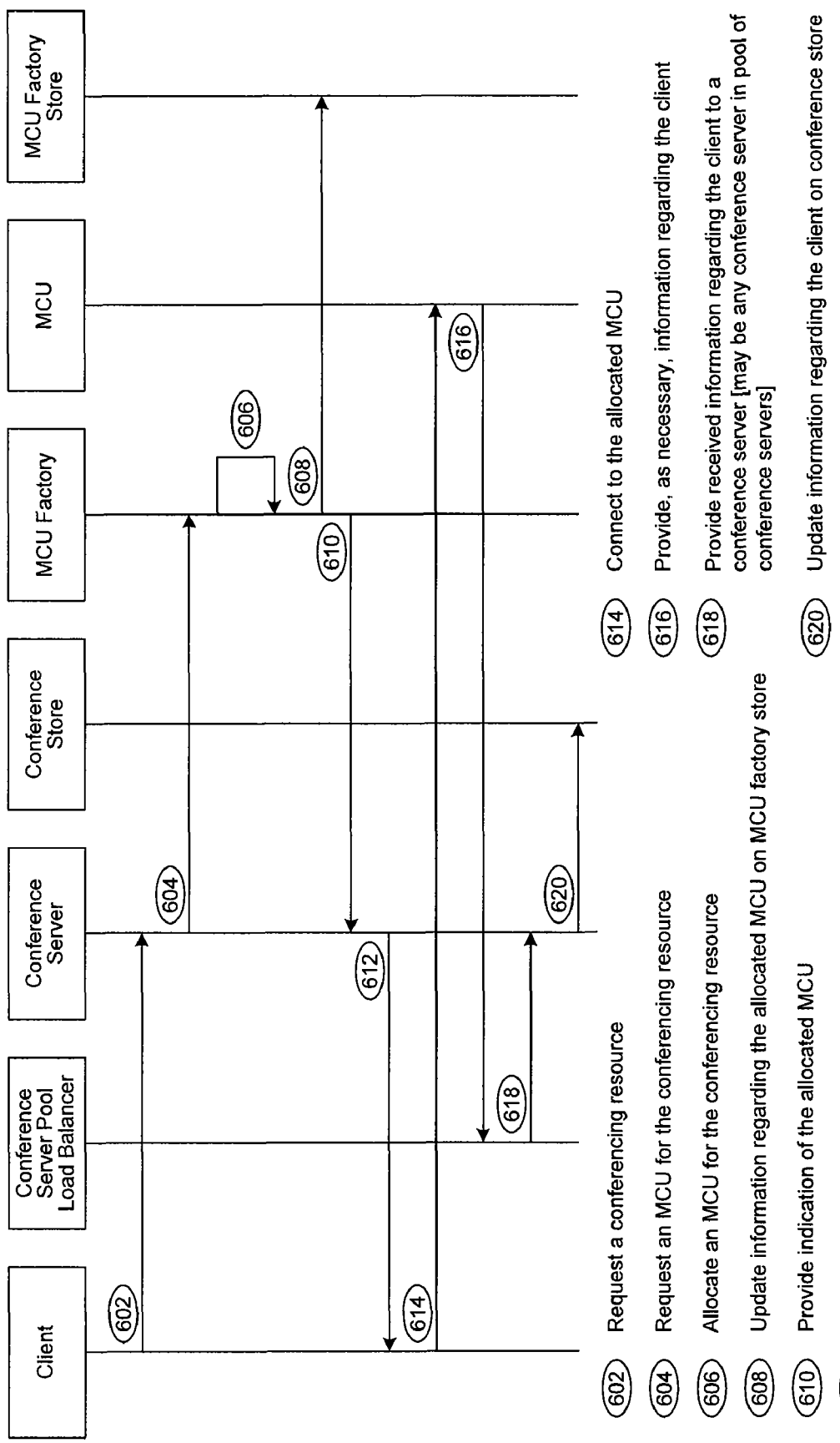
FIG. 6 is a data flow diagram that illustrates the flow of data to obtain an MCU for a conference, according to some embodiments.

FIG. 6 is a data flow diagram that illustrates the flow of data to obtain an MCU for a conference, according to some embodiments. A user participating in a conference may request a specific conferencing resource, such as application sharing, and the client may send a request 602 for the specific conferencing resource to the connected conference server (i.e., the conference server that the client is presently connected to in order to participate in the conference). Upon receiving the request, the conference server sends a request 604 for an MCU that is capable of providing the requested conferencing resource to the MCU factory that is allocated to service the conference. The MCU factory then determines 606 which MCU that is capable of providing the requested conferencing resource is best suited to service the conference, and allocates that MCU to the conference server in order to provide the conferencing resource (e.g., application sharing) to the conference. In some embodiments, the MCU factory allocates the MCU that has the most capacity available. In some embodiments, the MCU factory may allocate multiple MCUs that are capable of providing the requested conferencing resource. In this instance, the multiple MCUs may collaborate with each other (e.g., determine which MCU is better suited to provide the conferencing resource at any given point in time) to provide the requested conferencing resource, and a client may connect to any of the multiple MCUs to receive the conferencing resource. The MCU factory updates 608 the information regarding the allocated MCU on the MCU factory store. For example, the MCU factory may update information regarding the allocation of the MCU to the conference server, the additional load assigned to the MCU, etc. The MCU factory then provides 610 an indication of the allocated MCU to the conference server. Upon receiving the indication, the conference server provides 612 an indication of the allocated MCU to the client, and directs the client to connect to the indicated MCU. The conference server may maintain information regarding the allocation of the MCU to service the conference by providing the requested conferencing resource on the shared conference store. The client then connects 614 to the allocated MCU. The allocated MCU then provides 616, as necessary while servicing the conference, information regarding the client to the conference server pool load balancer. For example, the allocated MCU may provide information regarding the states of the clients that are connected to the MCU. For example, in the case of an audio MCU, the conference state information regarding the client may indicate that the client is now "muted." Similarly, in the case of an application sharing MCU, the conference state information regarding the client may indicate that the client is now "presenting." The conference server pool load balancer then provides 618 the information regarding the client received from the MCU to a conference server for maintaining in the shared conference store. Upon receiving the information, the conference server updates 620 the information regarding the client on the shared conference store. By sending the information for maintaining on the shared conference store to the conference server pool, the MCU is able to communicate conference state changes to the connected conference clients for maintaining on the shared conference store as long as at least one conference server is available in the conference server pool.

In some embodiments, upon determining a need to update conference state information for a connected client, the MCU can send a request for a conference server to the conference server pool load balancer. In response, the conference server pool load balancer can allocate a conference server, and provide an indication of the allocated conference server to the MCU. The MCU can then send the conference state information for the client to the conference server, and the conference server can update the information regarding the client on the shared conference store.

Figure 7:
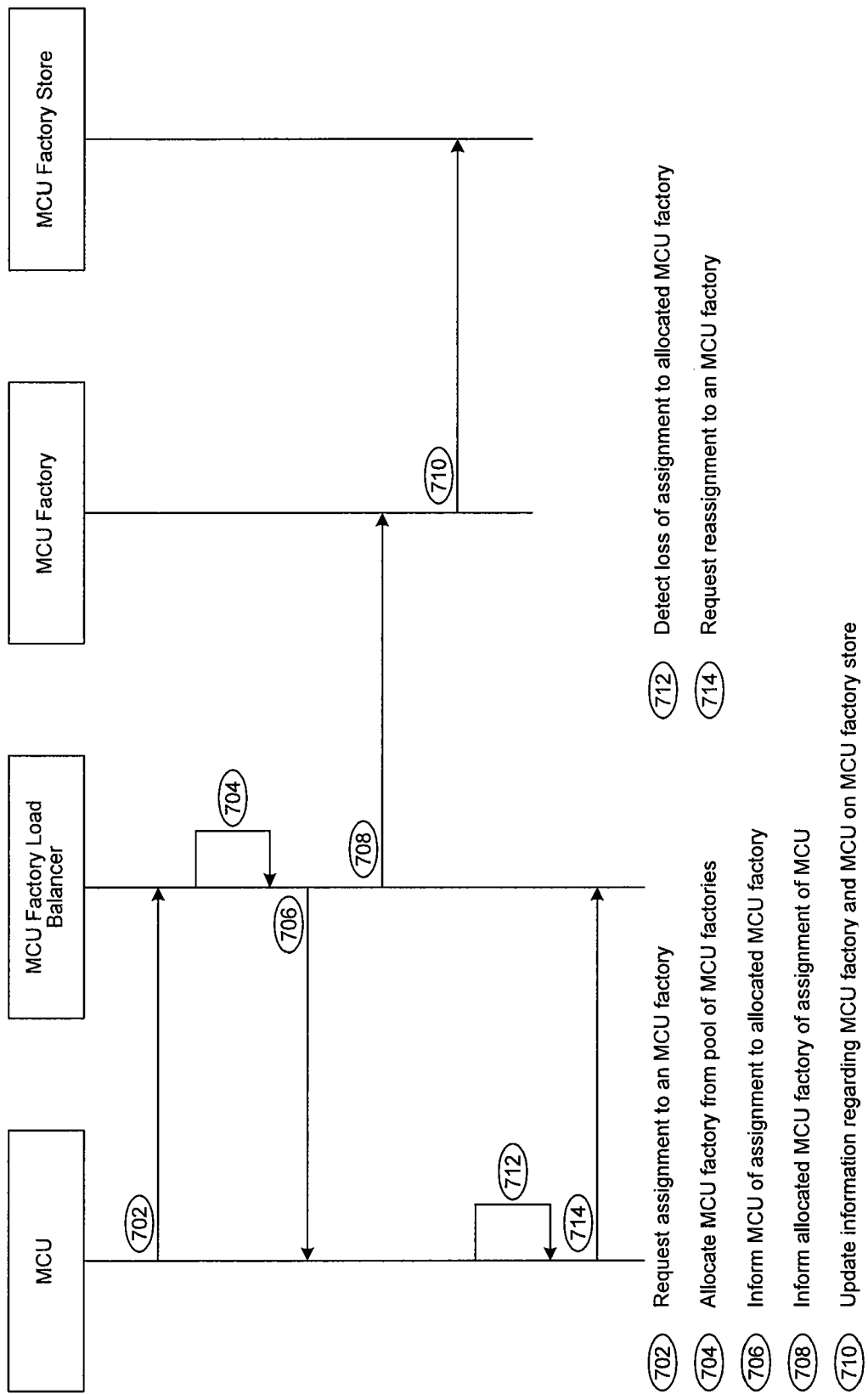
FIG. 7 is a data flow diagram that illustrates the flow of data to assign an MCU to an MCU factory, according to some embodiments.

FIG. 7 is a data flow diagram that illustrates the flow of data to assign an MCU to an MCU factory, according to some embodiments. By way of example, when starting to execute, an MCU can send a request 702 to be assigned to an MCU factory to the MCU factory load balancer. Upon receiving the request, the MCU factory load balancer determines 704 which MCU factory the MCU should be assigned to, and allocates an MCU factory for the MCU. In some embodiments, the MCU factory load balancer allocates the MCU factory that has the most capacity available to manage the MCU. One skilled in the art will appreciate that many different load balancing techniques may be used to allocate the MCU factories in the MCU factory pool. For example, the MCU factory load balancer may allocate an MCU factory that may need the type of shared conference resource provided by the MCU. The MCU factory load balancer then provides 706 an indication of the allocated MCU factory to the MCU. The MCU factory load balancer also provides 708 an indication of the assignment of the MCU to the allocated MCU factory. The allocated MCU factory updates 710 the information regarding the MCU factory and the MCU on the MCU factory store. For example, the allocated MCU may maintain information such as the assignment of the MCU to the allocated MCU factory on the MCU factory store. In some embodiments, the MCU may periodically send status update messages that indicate, for example, the status of the MCU to the allocated MCU factory to which it is assigned. Subsequently, the MCU may detect 712 a loss of the assignment to the allocated MCU factory. For example, the MCU factory may have encountered an error and stopped executing and the MCU may determine that the assignment to the MCU factory is lost because of a failure to receive a response to a status update message from the MCU factory. Upon detecting the loss of the assignment to the allocated MCU factory, the MCU can send a request 714 to be assigned to another MCU factory to the MCU factory load balancer. The MCU factory load balancer can then assign the MCU to another MCU factory in the MCU factory pool. In some embodiments, an MCU may not know which MCU factory it is assigned to. For example, the MCU factory load balancer may seamlessly represent the MCU factories in the MCU factory pool as a single virtual entity to the MCUs.

Figure 8:
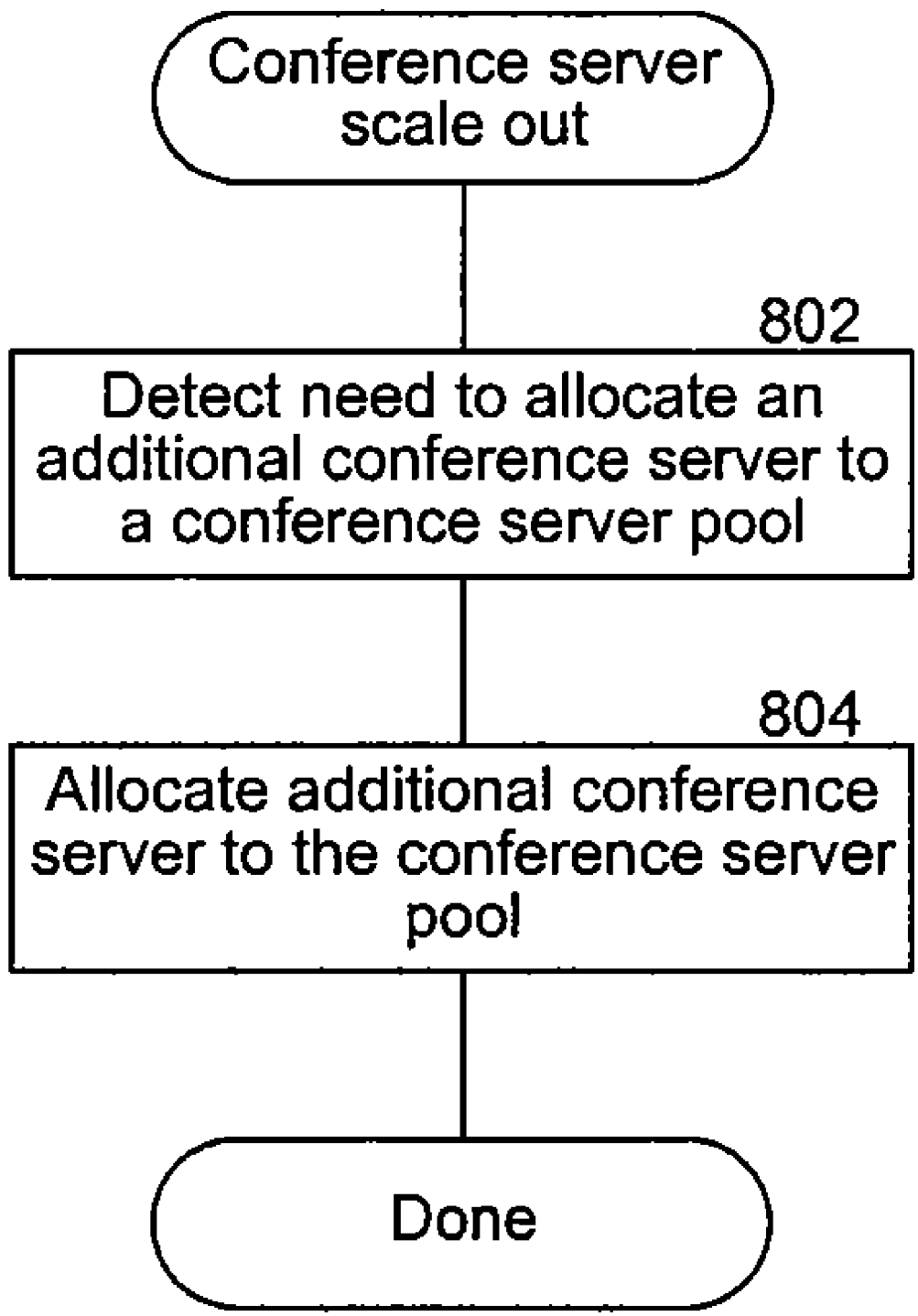
FIG. 8 is a flow diagram that illustrates the processing of a component of the conference system to scale out a conference server, according to some embodiments.

FIG. 8 is a flow diagram that illustrates the processing of a component of the conference system to scale out a conference server, according to some embodiments. By way of example, the component of the conference system may be monitoring the processing load placed on the conference servers in the conference server pool. In block 802, the component may detect a need to allocate an additional conference server to the conference server pool. For example, the component may determine that the processing load on conference servers in the conference server pool exceed a predetermined threshold that indicates the need for an additional conference server to be included in the conference server pool. In block 804, the component allocates the additional conference server to the conference server pool. The component then completes. For example, the conference system may maintain a pool of reserve conference servers that may be allocated to the conference server pool as necessary to provide the predetermined level of processing capability. Because the conference servers are stateless and all of the conference state information is maintained on the shared conference store, additional conference servers can easily be included in the conference server pool. Although not described, a similar approach can be utilized to scale out the MCUs and/or MCU factories.

Figure 9:
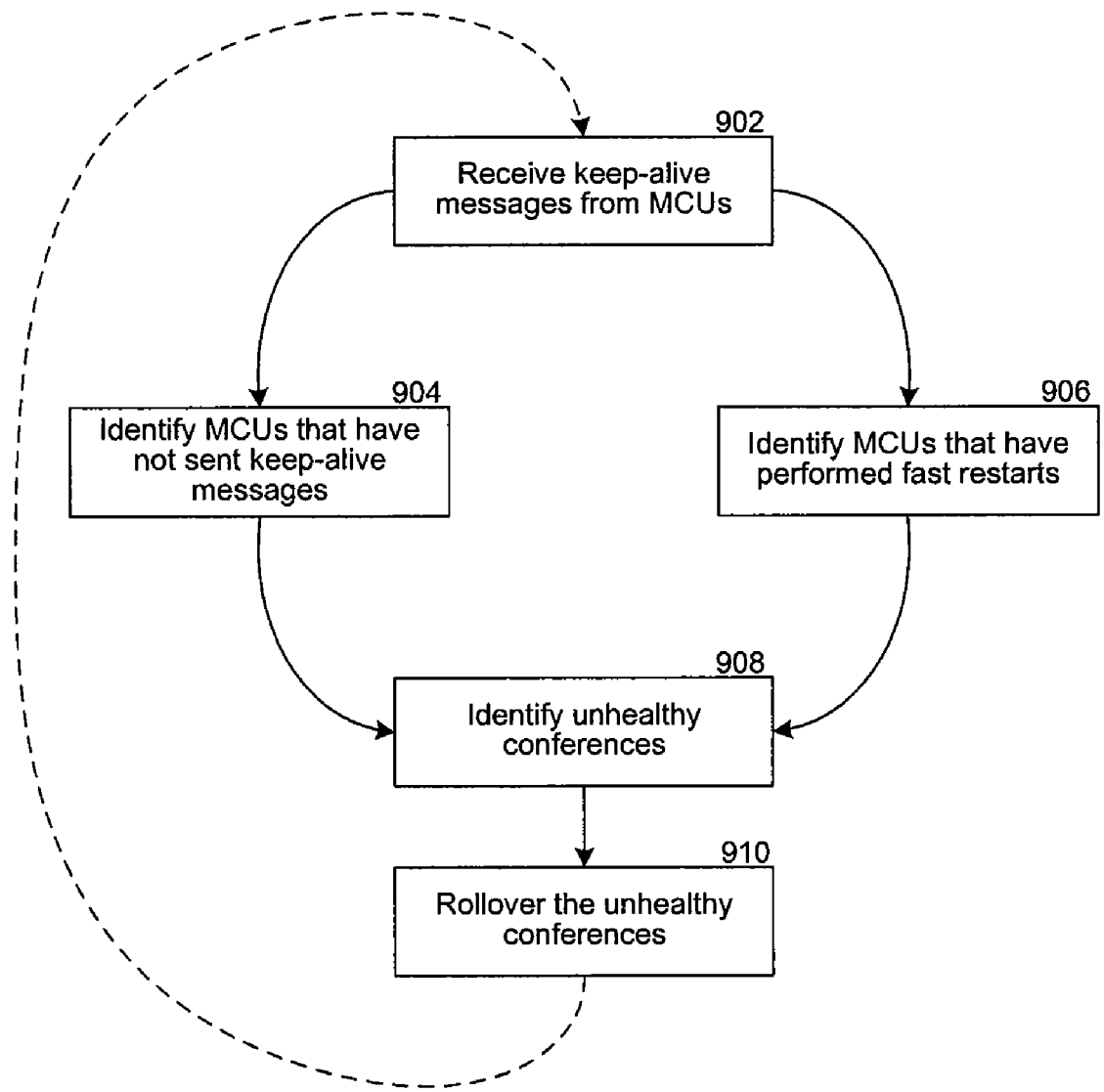
FIG. 9 is a block diagram that illustrates the processing flow to detect MCU failures and rollover unhealthy conferences, according to some embodiments.

FIG. 9 is a block diagram that illustrates the processing flow to detect MCU failures and rollover unhealthy conferences, according to some embodiments. The MCUs that are servicing one or more conferences that are being hosted by the conference system initiates the failure detection and rollover process by periodically sending keep-alive messages to the conference server pool. In block 902, the conference server pool receives the keep-alive messages from the MCUs and records indications of the received keep-alive messages in the shared conference store. In block 904, the conference server pool identifies the MCUs that have not sent the necessary keep-alive messages as suspected MCUs. For example, the conference system may require each MCU that is servicing at least one conference to send at least one keep-alive message per keep-alive interval to indicate the health of the sending MCU (i.e., to indicate that the MCU is healthy). The keep-alive interval is a predetermined time period, such as one minute, two minutes, five minutes, etc., which may be preprogrammed into the conference system or preconfigured by a conference system administrator or other authorized user of the conference system. An MCU that has not sent a keep-alive message for at least the predetermined keep-alive interval period is identified as a suspected MCU. In block 906, the conference server pool identifies the MCUs that have performed fast-restarts as suspected MCUs. In block 908, subsequent to identifying suspected MCUs in block 904 and/or block 906, the conference server pool identifies the unhealthy conferences that are associated with the suspected MCUs. In block 910, the conference server pool rollsover the unhealthy conferences. For example, for each suspected MCU, the conference server pool may identify the unhealthy conferences that are associated with the suspected MCU and allocate a replacement MCU. The conference server pool may then rollover the unhealthy conferences that are associated with the suspected MCU onto the newly allocated replacement MCU. The conference server pool then loops to block 902 (as indicated by the dashed line in FIG. 9) to continue the MCU failure detection and unhealthy conference rollover process.

Figure 10:
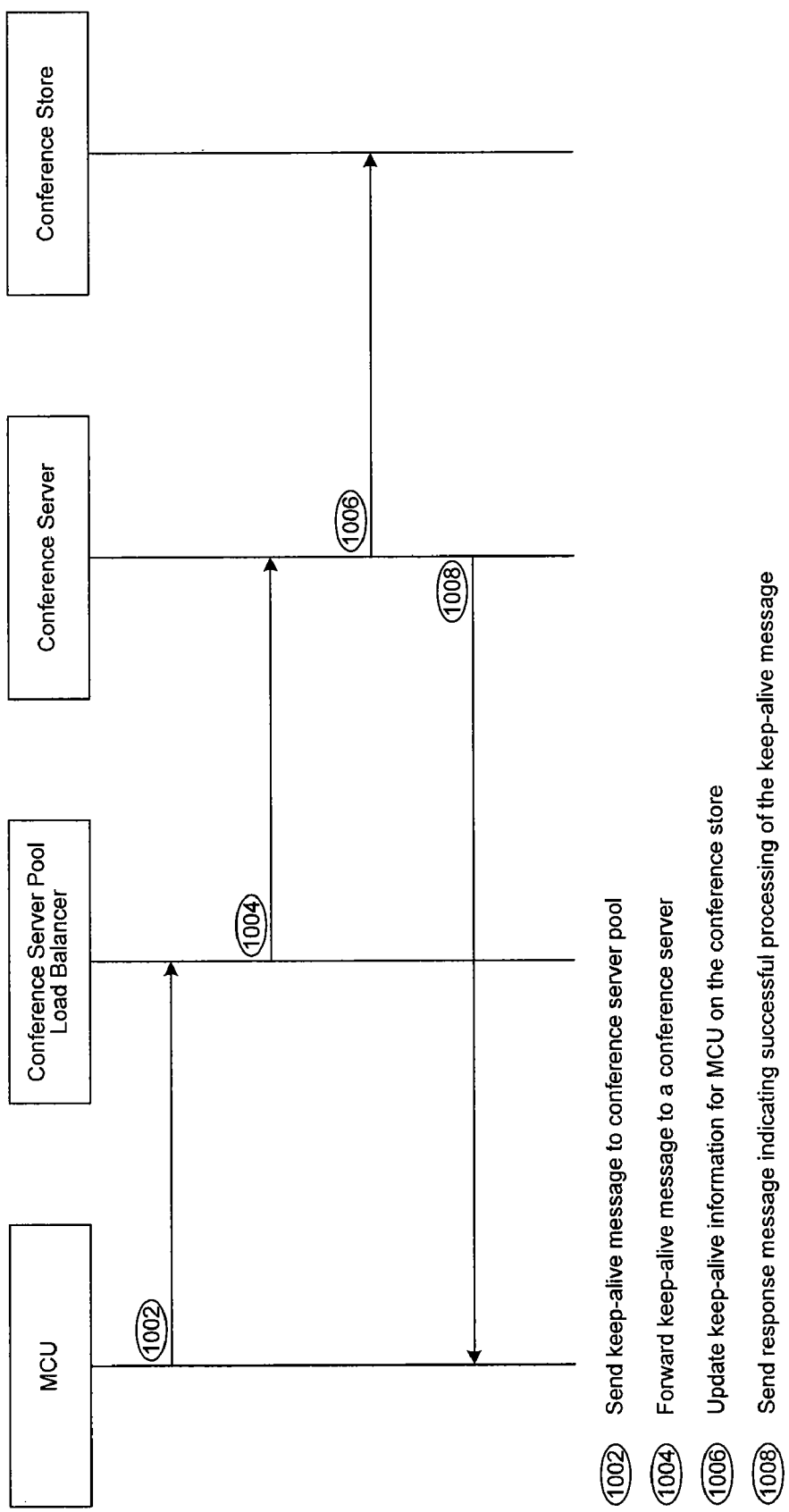
FIG. 10 is a data flow diagram that illustrates the flow of data to send a keep-alive message, according to some embodiments.

FIG. 10 is a data flow diagram that illustrates the flow of data to send a keep-alive message, according to some embodiments. An MCU that is servicing a conference that is being hosted by the conference system periodically sends 1002 a keep-alive message to the conference server pool. Upon receiving the keep-alive message, the conference server pool load balancer in the conference server pool allocates a conference server and forwards 1004 the received keep-alive message to the conference server for processing. The allocated conference server updates 1006 the keep-alive information for the MCU on the shared conference store, and sends 1008 a response message indicating the successful processing of the keep-alive message to the MCU. In the instance where the conference server is unable to successfully process the keep-alive message, the conference server can send a response message indicating that the keep-alive message was not successfully processed to the MCU.

In some embodiments, an MCU sends a keep-alive message upon receiving a request for the keep-alive message. For example, the conference server pool may periodically send to each MCU a request for the MCU to send a keep-alive message. In some embodiments, an MCU sends a keep-alive message for each conference that is being serviced by the MCU. In this instance, a keep-alive message indicates that a specific conference (e.g., a conference identified by the keep-alive message) is healthy. Thus, when a keep-alive message that indicates a specific conference is healthy is not received, the conference system may identify the specific conference as an unhealthy conference.

Figure 11:
FIG. 11 is a diagram that illustrates an example keep-alive message, according to some embodiments.

FIG. 11 is a diagram that illustrates an example keep-alive message, according to some embodiments. The keep-alive message is shown comprising, by way of example, an MCU identifier and an instance indicator. The MCU identifier identifies the MCU that is sending the keep-alive message. The instance indicator identifies the instance of the MCU that is sending the keep-alive message. The instance indicator allows for the distinction of one instance of the MCU from another instance of the MCU. For example, the instance indicator may be a timestamp that specifies a time that the instance of the MCU started executing. As another example, the instance indicator may be a numerical value that is incremented with each instance of the MCU (e.g., each time the MCU is restarted). Although not shown in FIG. 11, one of ordinary skill in the art will appreciate that the keep-alive message may contain other information and data. For example, the keep-alive message may include addressing and/or routing information that facilitates the sending of the keep-alive message by a sender and the receipt of the keep-alive message by a recipient.

Figure 12:
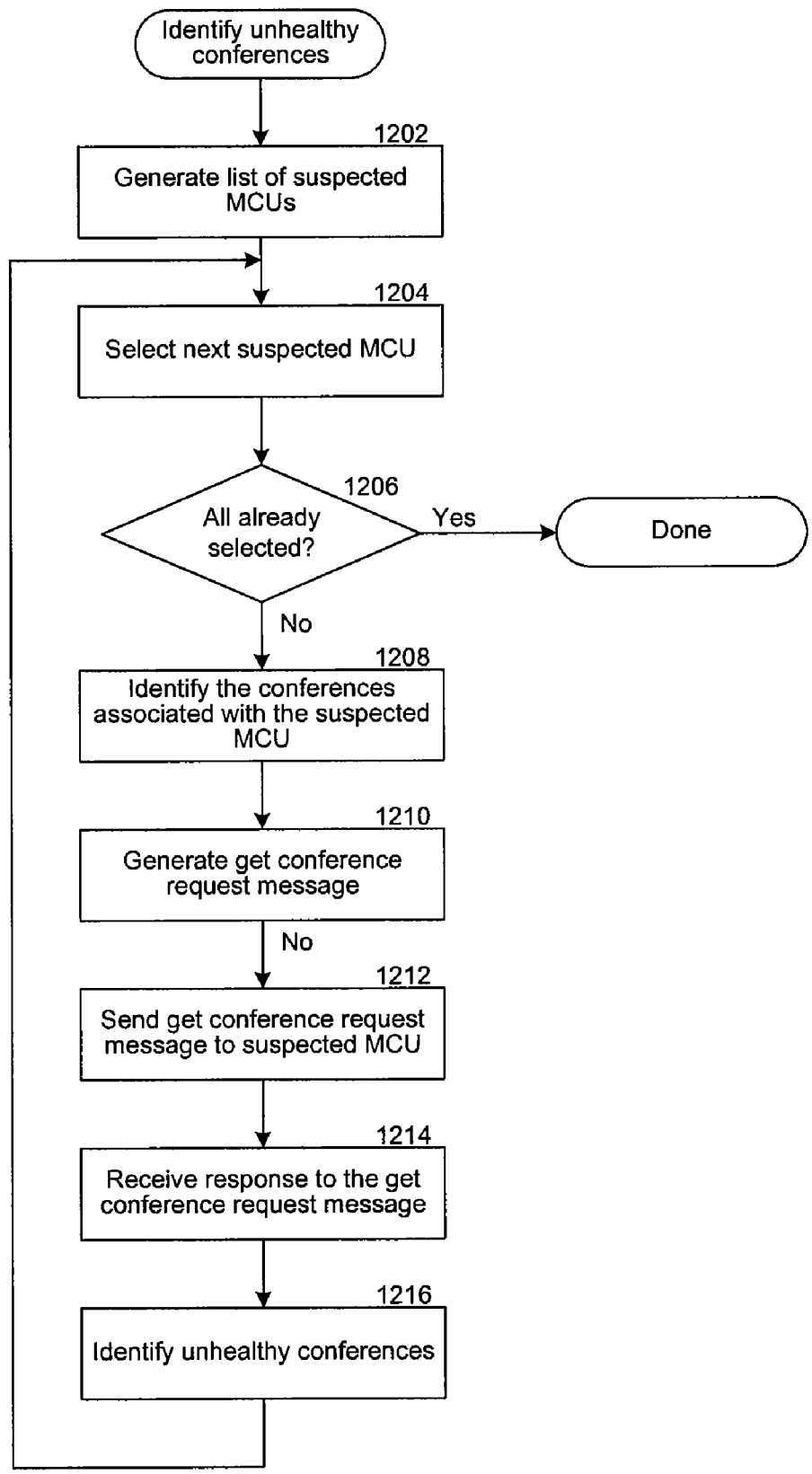
FIG. 12 is a flow diagram that illustrates the processing of a component of the conference system to identify unhealthy conferences, according to some embodiments.

FIG. 12 is a flow diagram that illustrates the processing of a component of the conference system to identify unhealthy conferences, according to some embodiments. For example, a conference server in the conference server pool may periodically identify the unhealthy conferences that are associated with the suspected MCUs. In block 1202, the conference server generates a list of suspected MCUs. The suspected MCUs are the MCUs from which an expected keep-alive message was not received or that performed a fast-restart. In blocks 1204-1216, the conference server loops identifying the unhealthy conferences that are associated with each suspected MCU. In block 1204, the conference server selects the next suspected MCU from the list of suspected MCUs. In decision block 1206, if all of the suspected MCUs have been selected, then the conference server completes, else the conference server continues at block 1208. In block 1208, the conference server identifies the conferences that are associated with the suspected MCU. For example, the conference server may identify the conferences associated with the suspected MCU from the information (e.g., conference state information, etc.) maintained on the shared conference store. The conference server may identify the conferences that are associated with the suspected MCU as suspect conferences. In block 1210, the conference server generates a get conference request message. In some embodiments, the conference server generates one get conference request message that includes an indication of all of the suspect conferences associated with the suspected MCU. In some embodiments, the conference server generates one get conference request message for each suspect conference associated with the suspected MCU. Here, each get conference request message includes an indication of one of the suspect conferences. In block 1212, the conference server sends the get conference request message to the suspected MCU. In block 1214, the conference server receives a response to the get conference request message. The response to the get conference request message provides an indication of whether the suspected MCU is servicing the suspect conferences identified in the get conference request message. In block 1216, the conference server identifies the suspect conferences that are unhealthy from the received response to the get conference request message. In the instance the conference server fails to receive a response to the get conference request message, the conference server identifies each suspect conference identified in the get conference request message as an unhealthy conference. The conference server then loops to block 1204 to select the nest suspected MCU from the list of suspected MCUs.

FIG. 13 is a diagram that illustrates an example get conference request message, according to some embodiments. The get conference request message is shown comprising, by way of example, a get conference request message identifier and a list of conference identifiers. The list of conference identifiers identifies one or more conferences. The get conference request message requests an indication of whether the recipient of the get conference request message is servicing the conferences that are identified in the message. The get conference request message identifier identifies the get conference request message. This identifier may be used to distinguish one get conference request message from another get conference request message. One of ordinary skill in the art will appreciate that the get conference request message may contain other information and data, such as, by way of example, addressing and/or routing information, etc.

FIG. 14 is a diagram that illustrates an example get conference response message, according to some embodiments. The get conference response message is sent in response to a get conference request message, and identifies the conferences that are being serviced by the sender of the get conference response message. The get conference response message is shown comprising, by way of example, a get conference response message identifier and a list of known conference identifiers. The list of known conference identifiers identifies one or more conferences that are known to (i.e., serviced by) the sender of the get conference response message. The get conference response message identifier identifies the get conference response message. This identifier may be used to distinguish one get conference response message from another get conference response message. One of ordinary skill in the art will appreciate that the get conference response message may contain other information and data, such as, by way of example, an indication of the get conference request message to which the get conference response message is responding to, addressing and/or routing information, etc.

Figure 15:
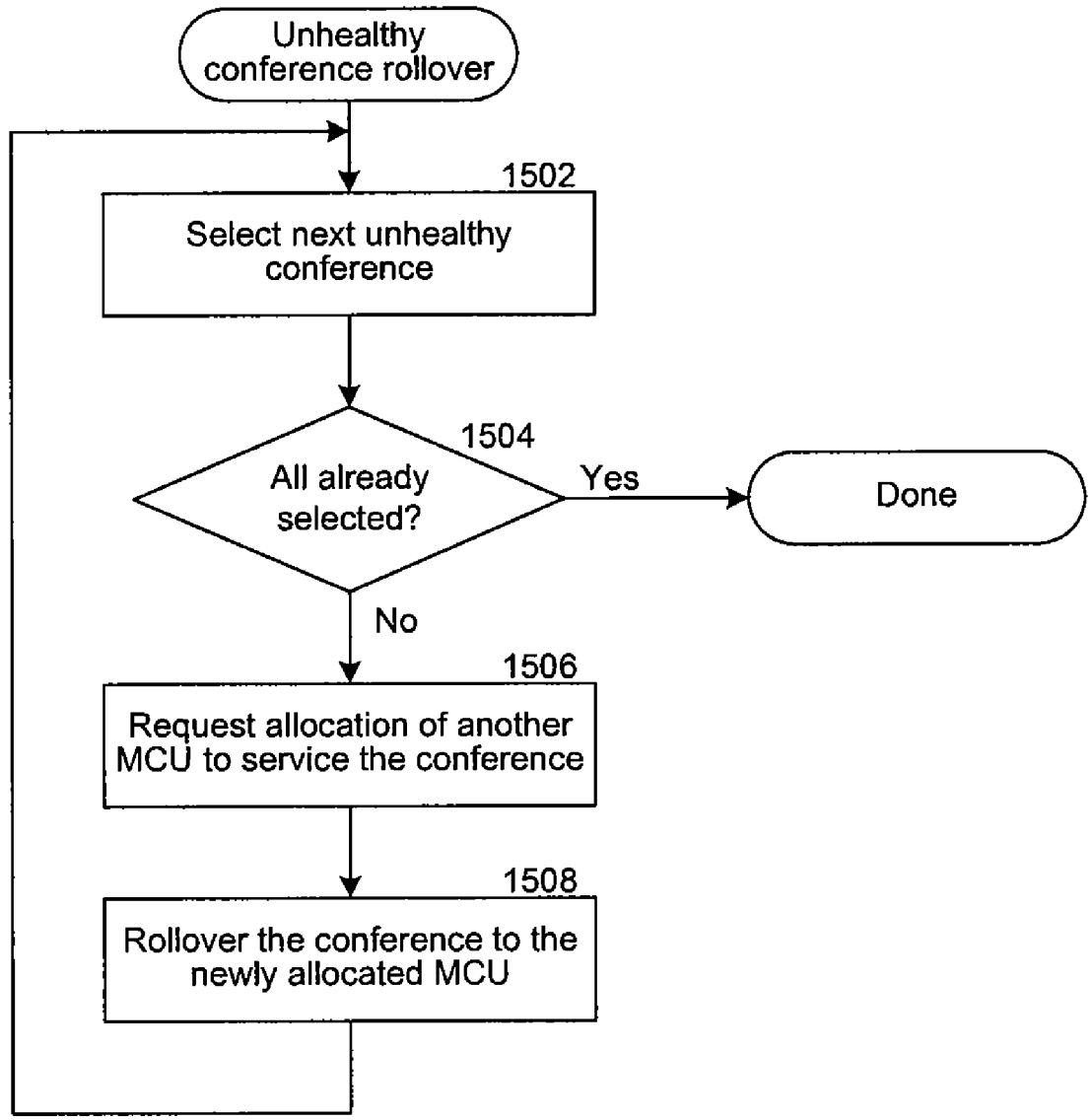
FIG. 15 is a flow diagram that illustrates the processing of a component of the conference system to rollover unhealthy conferences, according to some embodiments.

FIG. 15 is a flow diagram that illustrates the processing of a component of the conference system to rollover unhealthy conferences, according to some embodiments. For example, a conference server in the conference server pool may rollover the unhealthy conferences which were previously being serviced by suspected MCUs to a new MCU. In block 1502, the conference server selects the next unhealthy conference to rollover. In decision block 1504, if all of the unhealthy conferences have been selected, then the conference server completes, else the conference server continues at block 1506. In block 1506, the conference server requests an allocation of another MCU to service the unhealthy conference. In some embodiments, the conference server may send the request for another MCU to the MCU factory, and the MCU factory can allocate an MCU to service the unhealthy conference. The newly allocated MCU may be the same or a different MCU than the suspected MCU which preciously serviced the unhealthy conference. The newly allocated MCU provides the same shared conference resource as the suspected MCU which preciously serviced the unhealthy conference. In block 1508, the conference server rollsover the unhealthy conference to the newly allocated MCU by, for example, recreating, a possible, the conference state (the state associated with the unhealthy conference) on the newly allocated MCU. Upon the unhealthy conference being rolledover to the newly allocated MCU, the conference server no longer identifies the unhealthy conference as being unhealthy. The conference server then loops to block 1502 to select the next unhealthy conference to rollover.

Figure 16:
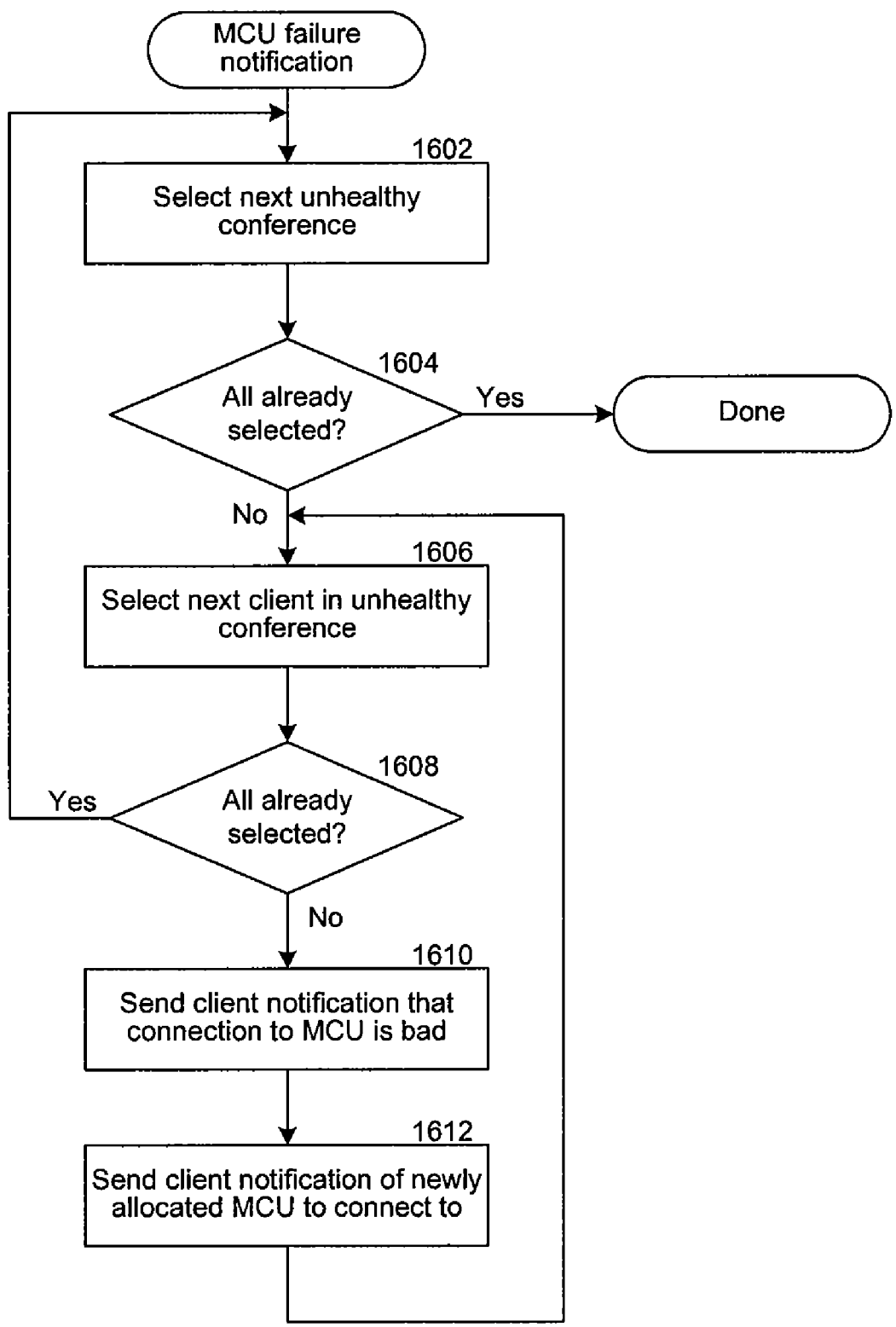
FIG. 16 is a flow diagram that illustrates the processing of a component of the conference system to send notification of failed MCUs, according to some embodiments.

FIG. 16 is a flow diagram that illustrates the processing of a component of the conference system to send notification of failed MCUs, according to some embodiments. For example, upon rollingover the unhealthy conferences to newly allocated MCUs, a conference server in the conference server pool may notify the clients that are participating in the unhealthy conferences of the failed MCUs. In block 1602, the conference server selects the next unhealthy conference to process. In decision block 1604, if all of the unhealthy conferences have been selected, then the conference server completes, else the conference server continues at block 1606. In block 1606, the conference server selects a next client that is participating in the unhealthy conference. In decision block 1608, if all of the clients that are participating in the unhealthy conference have been selected, then the conference server loops to block 1602 to select the next unhealthy conference to process, else the conference server continues at block 1610. In block 1610, the conference server sends the client a notification that the client's connection to the MCU (i.e., the MCU that preciously serviced the unhealthy conference) is bad. In block 1612, the conference server sends the client a notification of the newly allocated MCU to connect to. The client can then connect to the indicated newly allocated MCU in order to continue with the media session provided by the newly allocated MCU. The conference server then loops to block 1602 to select the next unhealthy conference to process.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, although the conference server pool has been described as containing a conference server pool load balancer that receives and initially processes the request made to the conference server pool, the conference system may provide another component in the conference server pool that receives and initially processes the requests made to the conference server pool. In a similar manner, the conference system may provide another component in the MCU factory pool that receives and initially processes the requests made to the MCU factory pool. Accordingly, the invention is not limited except as by the appended claims.

We claim:

1. A computer-implemented method for detecting failure of a shared conference resource in a conference system, the method comprising:
receiving at a conference server pool from a shared conference resource a keep-alive message sent by the shared conference resource, the shared conference resource servicing a plurality of associated conferences;
upon receiving the keep-alive message, updating information regarding keep-alive messages sent by the shared conference resource on a conference store;
upon determining that a keep-alive message has not been received from the shared conference resource for at least a keep-alive interval:
identifying the plurality of conferences that are associated with the shared conference resource;
indicating that each identified conference is suspected as being unhealthy;
sending a get conference request from a conference server in the conference server pool to the shared conference resource to determine a health status of the conferences serviced by the shared conference resource;
upon receiving a response to the get conference request,
for each of the identified conferences that are listed in the response as being healthy, indicating that the identified conference is healthy
for each of the identified conferences that are not listed in the response as being healthy, indicating the identified conference is unhealthy,
if the conference server does not receive a response to the get conference request, indicating that that each identified conference is unhealthy;
when at least one identified conference is indicated as unhealthy,
requesting by the conference server a replacement shared conference resource to service the unhealthy conference; and
rolling over each unhealthy conference associated with the shared conference resource to the replacement shared conference resource;
wherein at least one of the identified conferences is rolled over to be serviced by the replacement shared conference resource and at least one of the identified conferences continues to be serviced by the shared conference resource.

2. The method of claim 1, wherein,
upon receiving at the conference server pool from the shared conference resource the keep-alive message sent by the shared conference resource, forwarding the keep-alive message to a conference server in the conference server pool, and
further wherein the conference server updates information regarding keep-alive messages sent by the shared conference resource on a conference store.

3. The method of claim 2,
wherein the conference server is stateless, and
further wherein the keep-alive message is forwarded to the stateless conference server by a conference server pool load balancer.

4. The method of claim 1, wherein the request for the replacement conference resource is made to a multipoint control unit factory.

5. The method of claim 1 further comprising,
upon determining that a shared conference resource has performed a fast-restart, sending from a conference server in the conference server pool to the shared conference resource a get conference request message,
the get conference request message identifying a conference associated with the shared conference resource and requesting an indication of whether the identified conference is being serviced by the shared conference resource.

6. The method of claim 1 further comprising:
for each indicated unhealthy conference, identifying clients in the unhealthy conference; and
sending to each identified client an indication of the replacement multipoint control unit to connect to.

7. The method of claim 1, wherein the request for the replacement multipoint control unit is made to a multipoint control unit factory.

8. The method of claim 1, further comprising:
identifying clients that are participating in the unhealthy conference;
notifying the clients of the unhealthy conference;
sending, from the conference server to the identified clients, an indication of the replacement shared conference resource to connect to;
connecting, by the identified clients to the replacement shared conference resource to continue the conference.

9. The method of claim 1, further comprising: in receiving a response to the get conference request, indicating that the specific conference associated with the shared conference request is healthy.

10. The method of claim 1, wherein, the conference server uses conference state information maintained in the conference store for the unhealthy conference to recreate, on the replacement shared conference resource, a conference state that was associated with the unhealthy conference.

11. A computer-implemented method for detecting failure of a shared conference resource in a conference system, the method comprising:
receiving at a conference server pool from one or more multipoint control units keep-alive messages sent by the multipoint control units and updating information regarding the keep-alive messages sent by the multipoint control units on a conference store, wherein each multipoint control unit provides a shared conference resource to a conference hosted by the conference server pool;
determining by a conference server in the conference server pool suspected multipoint control units from the keep-alive messages sent by the multipoint control units, wherein the conference server determines that a multipoint control unit is a suspected multipoint control unit upon determining that a keep-alive message has not been received from the multipoint control unit for at least a keep-alive interval; and
for each suspected multipoint control unit,
sending a get conference request from the conference server to the suspected multipoint control unit to determine a health status of a specific conference serviced by the shared conference resource;
wherein, the get conference request message including a list of conferences serviced by the suspected multipoint control unit which are suspected to be unhealthy;
if the conference server does not receive a response to the get conference request message, or if the conference server receives a response to the get conference request message indicating that at least one identified conferences is unhealthy:
requesting by the conference server a replacement multipoint control unit to service the unhealthy conferences;
rolling over the unhealthy conferences to the replacement multipoint control unit
wherein at least one of the conferences is rolled over to be hosted by the replacement multipoint control unit and at least one of the identified conferences continues to be hosted by the multipoint control unit.

12. The method of claim 11, wherein the keep-alive messages received at the conference server pool are processed by a conference server pool load balancer.

13. The method of claim 12,
wherein the conference server pool load balancer forwards the received keep-alive message to an appropriate conference server in the conference server pool, and
further wherein the appropriate conference server updates information regarding the keep-alive message on the conference store.

14. The method of claim 11, wherein the conference store is remote to conference servers in the conference server pool.

15. The method of claim 11, wherein the conference server determines that a multipoint control unit is a suspected multipoint control unit upon determining that the multipoint control unit performed a fast-restart.

16. A conferencing system that detects failure of a multipoint control unit, comprising:
a conference store for maintaining information regarding keep-alive messages sent by multipoint control units; and
at least one conference server that includes:
a memory storing computer-executable instructions implementing a module that
identifies a suspected multipoint control unit from the keep-alive messages sent by the multipoint control unit;
identifies a list of suspect conferences serviced by the suspected multipoint control unit;
sends a get conference request to the suspected multipoint control unit to determine a health status of the list of suspect conferences;
upon receiving a response to the get conference request indicating that at least one conference is unhealthy,
requests a replacement multipoint control unit to service the unhealthy conference; and
rolls over the indicated unhealthy conference to the replacement multipoint control unit
wherein at least one of the identified conferences is rolled over to be serviced by the replacement multipoint control unit and at least one of the identified conferences continues to be serviced by the multipoint control unit;
a processor that executes the computer-executable instructions store in the memory.

17. The system of claim 16, wherein the conference server determines that a multipoint control unit is a suspected multipoint control unit upon determining that the multipoint control unit has failed to send a keep-alive message for at least a keep-alive interval.

18. The system of claim 16, wherein the conference server determines that a multipoint control unit is a suspected multipoint control unit upon determining that the multipoint control unit has performed a fast-restart.

* * * * *